(12) United States Patent
Hyun et al.

(10) Patent No.: US 8,670,093 B2
(45) Date of Patent: Mar. 11, 2014

(54) LIQUID CRYSTAL DISPLAY DEVICE

(75) Inventors: Hye Rin Hyun, Gyeonggi-do (KR);
Jong Won Moon, Gyeonggi-do (KR);
Jong Beom Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 2337 days.

(21) Appl. No.: 13/182,113

(22) Filed: Jul. 13, 2011

(65) Prior Publication Data

US 2012/0013832 A1   Jan. 19, 2012

(30) Foreign Application Priority Data

Jul. 16, 2010 (KR) .................. 10-2010-0068918

(51) Int. Cl.
*G02F 1/1335* (2006.01)

(52) U.S. Cl.
USPC .......................................... 349/115

(58) Field of Classification Search
None
See application file for complete search history.

(56) References Cited

U.S. PATENT DOCUMENTS

| | | | |
|---|---|---|---|
| 6,731,351 B2 | 5/2004 | Platz et al. | |
| 2008/0074383 A1 | 3/2008 | Dean | |
| 2010/0097549 A1 | 4/2010 | Ishikawa | |

FOREIGN PATENT DOCUMENTS

| | | |
|---|---|---|
| JP | 2002-131733 A | 5/2002 |
| WO | 03/021343 A1 | 3/2003 |
| WO | 2007/039863 A1 | 4/2007 |

OTHER PUBLICATIONS

Office Action issued in corresponding Korean Patent Application No. 10-2010-0068918 dated Dec. 18, 2012.
European Search Report in dated Sep. 12, 2011 related to corresponding European patent application 11170146.2.

*Primary Examiner* — Thanh-Nhan P Nguyen
(74) *Attorney, Agent, or Firm* — Morgan, Lewis & Bockius LLP

(57) ABSTRACT

Disclosed is an LCD device which facilitates to realize a high aesthetic sense by obtaining a colorful and entirely-unified color screen under the circumstance that an image is not displayed in a turning-off state, wherein the LCD device comprises: a liquid crystal module which comprises a liquid crystal panel for displaying an image; a set cover which supports the liquid crystal module; and a color realization film which selectively transmits light with a predetermined wavelength when the liquid crystal module is turned-off, wherein the color realization film comprises a cholesteric liquid crystal layer (CLC), a quarter wave plate (QWP), and a first adhesive layer formed between the cholesteric liquid crystal layer (CLC) and the quarter wave plate (QWP).

15 Claims, 5 Drawing Sheets

LIQUID CRYSTAL DISPLAY DEVICE

CROSS REFERENCE TO RELATED APPLICATIONS

This application claims the benefit of the Korean Patent Application No. 10-2010-0068918 filed on Jul. 16, 2010, which is hereby incorporated by reference as if fully set forth herein.

BACKGROUND

1. Field of the Invention

The present invention relates to a liquid crystal display (LCD) device, and more particularly, to an LCD device having a good appearance with high aesthetic sense.

2. Discussion of the Related Art

A liquid crystal display (LCD) device may be widely used in various fields of notebook computer, monitor, spacecraft, aircraft, and etc. owing to advantages of low driving voltage, low power consumption and portability.

Hereinafter, a related art LCD device will be described with reference to the accompanying drawings.

FIG. 1 is a perspective view illustrating a monitor to which a related art LCD device is applied.

As shown in FIG. 1, a related art LCD device comprises a liquid crystal module 10 and an external cover 20.

The liquid crystal module 10 comprises a liquid crystal panel for displaying an image; and a backlight unit for supplying light to the liquid crystal panel.

The external cover 20 is an external case of a product such as a monitor, wherein the external cover 20 supports the liquid crystal module 10. Especially, the external cover 20 covers all margins of the liquid crystal module 10 except an image-displaying area.

The related art LCD device has been developed in technical aspects, for example, rapid response speed and good picture quality. However, recent studies and developments for the LCD device focus on a design capable of appealing to consumers. Thus, there is the progress in developing the design which facilitates to arouse the consumers' interest through the improved aesthetic sense.

Especially, there is the increasing need for a colorful design in accordance with the consumers' taste. However, the related art LCD device can not satisfy the consumers' taste. For example, in order to realize the colorful design, it is needed to change the color of the external cover 20 from a related art black color to the other colors. However, if the external cover 20 is changed in color, the visual aesthetic effect of the LCD device may be deteriorated under the circumstance that the image is not displayed by turning-off the LCD device That is, the liquid crystal module 10 is black-colored when the image is not displayed by turning-off the LCD device. Thus, since the LCD device is not unified in color, it is difficult to realize the exquisite image.

SUMMARY

Accordingly, the present invention is directed to an LCD device that substantially obviates one or more problems due to limitations and disadvantages of the related art.

An aspect of the present invention is to provide an LCD device which facilitates to realize a high aesthetic sense by obtaining a colorful and entirely-unified color screen under the circumstance that an image is not displayed in a turning-off state.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an LCD device comprising: a liquid crystal module which comprises a liquid crystal panel for displaying an image; a set cover which supports the liquid crystal module; and a color realization film which selectively transmits light with a predetermined wavelength when the liquid crystal module is turned-off, wherein the color realization film comprises a cholesteric liquid crystal layer (CLC), a quarter wave plate (QWP), and a first adhesive layer formed between the cholesteric liquid crystal layer (CLC) and the quarter wave plate (QWP).

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, an LCD device according to the present invention will be described with reference to the accompanying drawings.

Figure 1:
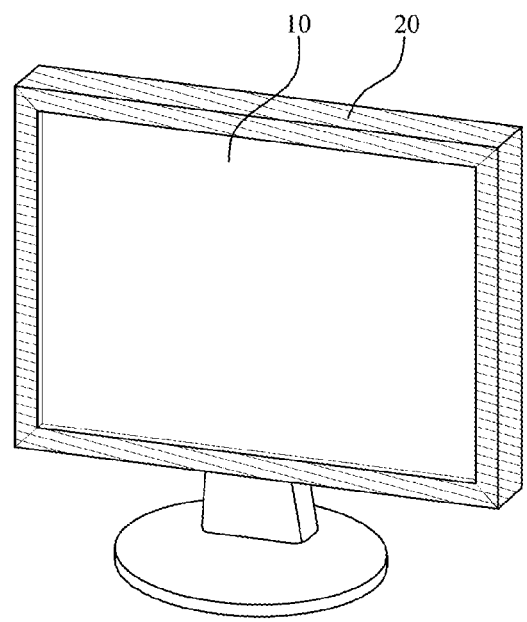
FIG. 1 is a perspective view illustrating a monitor to which a related art LCD device is applied.
Figure 2:
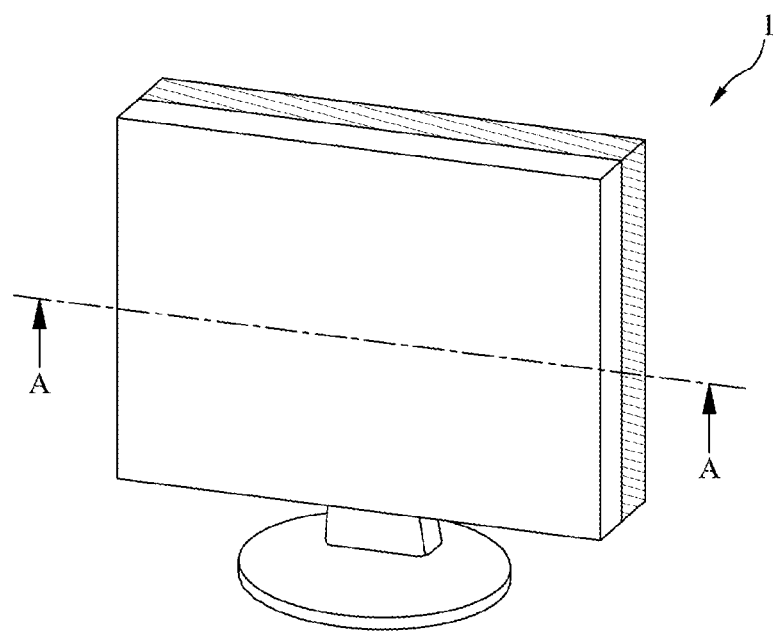
FIG. 2 is a perspective view illustrating a monitor to which an LCD device of the present invention is applied.

FIG. 2 is a perspective view illustrating a monitor to which an LCD device according to the present invention is applied. FIGS. 3 to 10 are cross section views illustrating LCD devices according to various embodiments of the present invention, which are cross section views along A-A of FIG. 2.

As shown in FIG. 2, the LCD device according to the present invention obtains a high aesthetic sense owing to a flat front surface, and also realizes a colorful screen even when an image is not displayed in a turning-off state. Hereinafter, the LCD devices according to the various embodiments of the present invention will be described in detail as follows.

Figure 3:
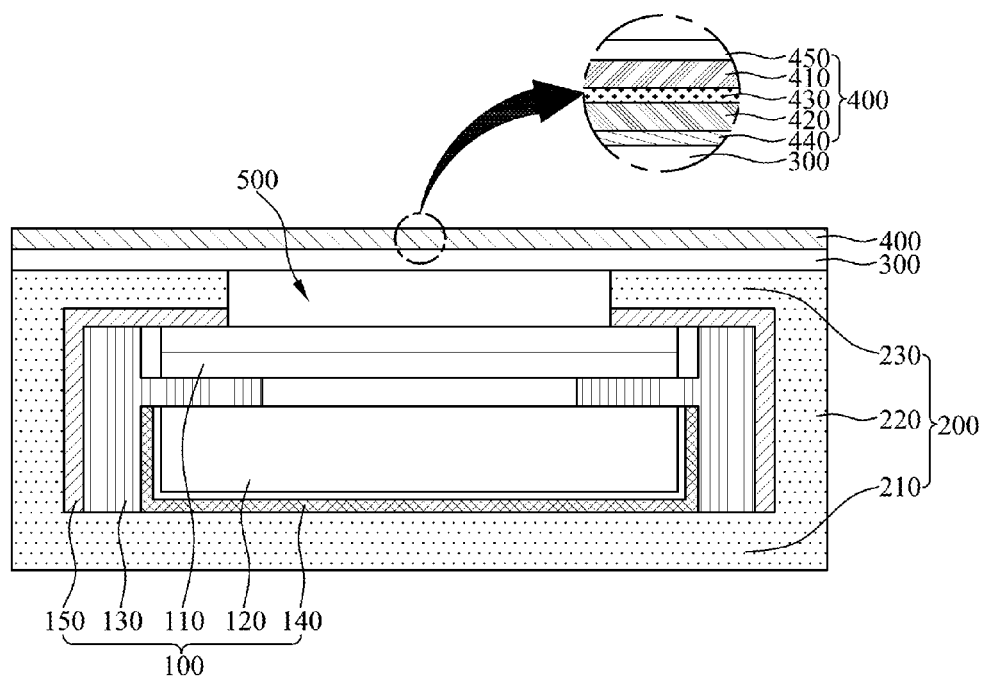
FIG. 3 is a cross section view illustrating an LCD device according to the first embodiment of the present invention.

FIG. 3 is a cross section view illustrating an LCD device according to the first embodiment of the present invention.

As shown in FIG. 3, the LCD device according to the first embodiment of the present invention comprises a liquid crystal module 100, a set cover 200, a protection plate 300, and a color realization film 400.

The liquid crystal module 100 comprises a liquid crystal panel 110, a backlight unit 120, a guide frame 130, a lower case 140, and an upper case 150.

The liquid crystal panel 110 for displaying an image comprises lower and upper substrates facing each other; a liquid crystal layer formed between the lower and upper substrates; an upper polarizing plate attached to an upper surface of the upper substrate; and a lower polarizing plate attached to a lower surface of the lower substrate. A detailed structure of each of the lower and upper substrates may be changed to generally-known configurations in accordance with an application mode, for example, Twisted Nematic (TN) mode, Vertical Alignment (VA) mode, In-Plane Switching (IPS) mode, and Fringe Field Switching (FFS) mode.

The backlight unit 120 is positioned under the liquid crystal panel 110, and the backlight unit 120 supplies light to the liquid crystal panel 110. The backlight unit 120 may be largely classified into a direct type backlight unit and an edge type backlight unit. In case of the direct type backlight unit, a light source is positioned under an entire lower surface of the liquid crystal panel 110, whereby light emitted from the light source is directly transmitted toward the liquid crystal panel 110. Meanwhile, in case of the edge type backlight unit, a light source is positioned at a lower side of the liquid crystal panel 110, whereby light emitted from the light source is guided toward the liquid crystal panel 110 by the use of light-guiding plate. The LCD device according to the present invention may use any one of the direct type backlight unit and the edge type backlight unit. Especially, the edge type backlight unit 120 comprises a light source such as a light-emitting diode; a light-guiding plate which confronts the light source, and guides light emitted from the light source toward the liquid crystal panel 110; a plurality of optical sheets which are positioned on an upper surface of the light-guiding plate, and are provided to improve uniformity of light passing through the light-guiding plate; and a reflection plate which is positioned under the light-guiding plate so as to reflect the leaking light for improvement of light efficiency.

The guide frame 130 serves as a guide for positioning the liquid crystal panel 110 and the backlight unit 120.

The lower and upper cases 140 and 150 receive the liquid crystal panel 110, the backlight unit 120, and the guide frame 130 therein; and simultaneously serve as an external case of the liquid crystal module 100.

A detailed structure of the liquid crystal module 100 may be changed to various configurations generally known to those skilled in the art.

The set cover 200 supports the liquid crystal module 100, and serves as an external cover of a product such as a monitor. The set cover 200 comprises a lower set cover 210; a lateral set cover 220 extending from the lower set cover 210; and a frontal set cover 230 extending from the lateral set cover 220. The frontal set cover 230 covers a frontal margin of the liquid crystal module 100 except an image-displaying area, wherein the frontal margin of the liquid crystal module 100 includes an edge of the liquid crystal module 100, and the frontal surface area immediately adjacent to the edge of the liquid crystal module 100.

The set cover 200 may be made of various colors in consideration for consumers' taste.

The protection plate 300 is formed on an entire front surface of the LCD device, which prevents the liquid crystal panel 100 from being exposed to the external, that is, which prevents the liquid crystal panel 100 from being scratched or damaged. Also, the protection plate 300 makes the front surface of the LCD device look flat, thereby improving an aesthetic sense of the LCD device. The protection plate 300 is attached to the set cover 200, and more particularly, to the frontal set cover 230.

The protection plate 300 may be formed of a transparent material, for example, Polyethylene Terephthalate, Polyacrylate, Polyethylene, Polycarbonate, Polyester, or tempered glass.

The color realization film 400 is formed on the protection plate 300, which forms the forefront of the LCD device. The color realization film 400 is designed to display a predetermined color when the liquid crystal module 100 is turned-off, to thereby improve an aesthetic sense of the LCD device. In more detail, when the liquid crystal module 100 is turned-off, the color realization film 400 selectively reflects light with a predetermined wavelength. Especially, the color realization film 400 is formed in such a manner that it reflects light whose color is the same as that of the set cover 200. Thus, when the liquid crystal module 100 is turned-off, the entire front surface of the LCD device is shown as one color.

The color realization film 400 comprises a cholesteric liquid crystal layer (CLC) 410, a quarter wave plate (QWP) 420, a first adhesive layer 430, a second adhesive layer 440, and a protection layer 450.

The cholesteric liquid crystal layer (CLC) 410 and the quarter wave plate (QWP) 420 enable the color realization film 400 to selectively reflect light with the predetermined wavelength when the liquid crystal module 100 is turned-off. Meanwhile, when the liquid crystal module 100 is turned-on, the cholesteric liquid crystal layer (CLC) 410 and the quarter wave plate (QWP) 420 make an image displayed without disturbance of the color realization film 400. This will be explained in detail as follows.

The cholesteric liquid crystal layer (CLC) 410 is designed to have a left-handed pitch or right-handed pitch. Thus, the cholesteric liquid crystal layer (CLC) 410 reflects the light circularly-polarized in the same direction, and transmits the light circularly-polarized in the opposite direction. For example, if the cholesteric liquid crystal layer (CLC) 410 is designed to have the left-handed pitch, the cholesteric liquid crystal layer (CLC) 410 reflects the light circularly-polarized in the left-handed direction, and transmits the light circularly-polarized in the right-handed direction.

An appropriate design of the left-handed pitch or right-handed pitch of the cholesteric liquid crystal layer (CLC) 410 enables to display the desire color by the selective reflection of the light with the predetermined wavelength when the ambient light is incident via the cholesteric liquid crystal layer (CLC) 410 under the circumstance that the liquid crystal module 100 is turned-off.

Under the circumstance that the liquid crystal module 100 is turned-on, the light is emitted from the liquid crystal module 100. Generally, the linearly-polarized light is emitted via the upper polarizing plate of the liquid crystal panel 110. The linearly-polarized light is delayed while passing through the quarter wave plate (QWP) 420, and is then incident on the cholesteric liquid crystal layer (CLC) 410.

Thus, if the quarter wave plate (QWP) 420 is designed appropriately in consideration for the cholesteric liquid crystal layer (CLC) 410, the light emitted from the liquid crystal module 100 is displayed as the image without being adversely influenced by the color realization film 400. For example, if the cholesteric liquid crystal layer (CLC) 410 is designed to have the left-handed pitch, the quarter wave plate (QWP) 420 is designed to make it possible to circularly polarize the light emitted from the liquid crystal module 100, in the right-handed direction. That is, when the light circularly-polarized in the right-handed direction is emitted via the quarter wave plate (QWP) 420, the emitted light easily passes through the cholesteric liquid crystal layer (CLC) 410 having the left-handed pitch, to thereby display the desire image.

For this, the cholesteric liquid crystal layer (CLC) 410 is positioned adjacent to the incident face of the ambient light; and the quarter wave plate (QWP) 420 is positioned adjacent to the liquid crystal panel 110. That is, the quarter wave plate (QWP) 420 is positioned between the cholesteric liquid crystal layer (CLC) 410 and the liquid crystal panel 100.

The first adhesive layer 430 is formed between the cholesteric liquid crystal layer (CLC) 410 and the quarter wave plate (QWP) 420, to thereby combine the cholesteric liquid crystal layer (CLC) 410 and the quarter wave plate (QWP) 420 with each other. The second adhesive layer 440 is formed between the quarter wave plate (QWP) 420 and the protection plate 300, to thereby combine the quarter wave plate (QWP) 420 and the protection plate 300 with each other. The first and second adhesive layers 430 and 440 may be formed of pressure sensitive adhesive (PSA), but not necessarily.

The protection layer 450 is formed on the cholesteric liquid crystal layer (CLC) 410, to thereby prevent the cholesteric liquid crystal layer (CLC) 410 from being scratched and damaged. The protection layer 450 may be formed by the use of various protection films generally known to those in the art.

Figure 4:
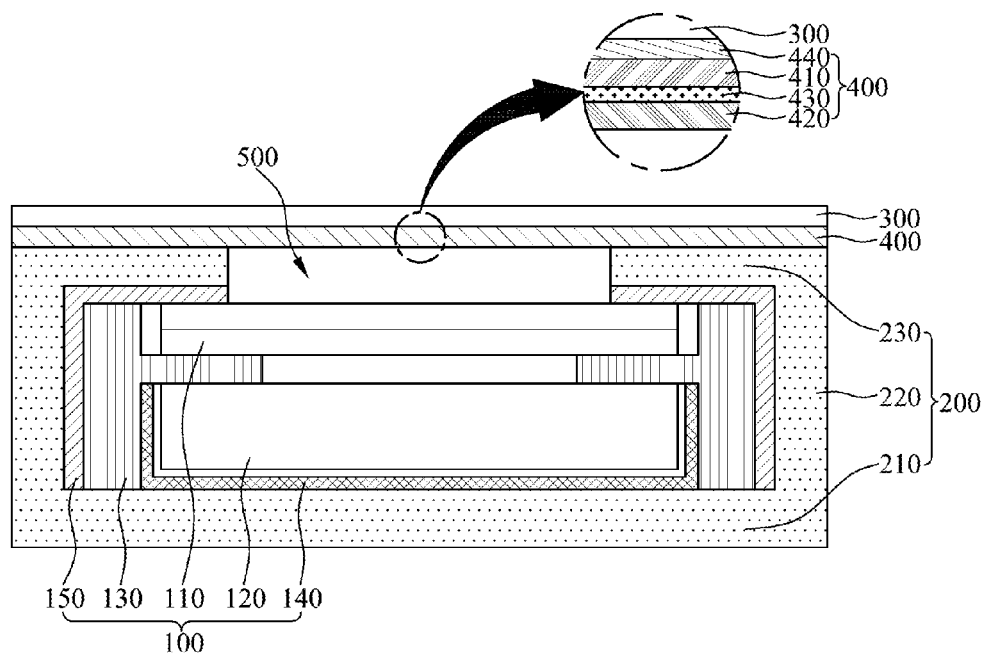
FIG. 4 is a cross section view illustrating an LCD device according to the second embodiment of the present invention.

FIG. 4 is a cross section view illustrating an LCD device according to the second embodiment of the present invention. Except that the protection plate 300 and color realization film 400 are changed in position, the LCD device of the second embodiment shown in FIG. 4 is similar to the LCD device of the first embodiment shown in FIG. 3. Thus, the same reference numbers will be used throughout the drawings to refer to the same or like parts, and a detailed explanation for the same parts will be omitted.

As shown in FIG. 4, according to the second embodiment of the present invention, the color realization film 400 is attached to the set cover 200, and more particularly, to the frontal set cover 230. The protection plate 300 is attached onto the color realization film 400, which forms the forefront of the LCD device.

Since the color realization film 400 is formed under the protection plate 300, the color realization film 400 comprises a cholesteric liquid crystal layer (CLC) 410; a quarter wave plate (QWP) 420; a first adhesive layer 430 formed between the cholesteric liquid crystal layer (CLC) 410 and the quarter wave plate (QWP) 420 to combine the cholesteric liquid crystal layer (CLC) 410 with the quarter wave plate (QWP) 420; and a second adhesive layer 440 formed between the cholesteric liquid crystal layer (CLC) 410 and the protection plate 300 to combine the cholesteric liquid crystal layer (CLC) 410 with the protection plate 300. There is no additional protection layer such as protection film. Although not shown, an adhesive is formed between the frontal set cover 230 and the color realization film 400, to thereby combine the frontal set cover 230 with the color realization film 400.

Figure 5:
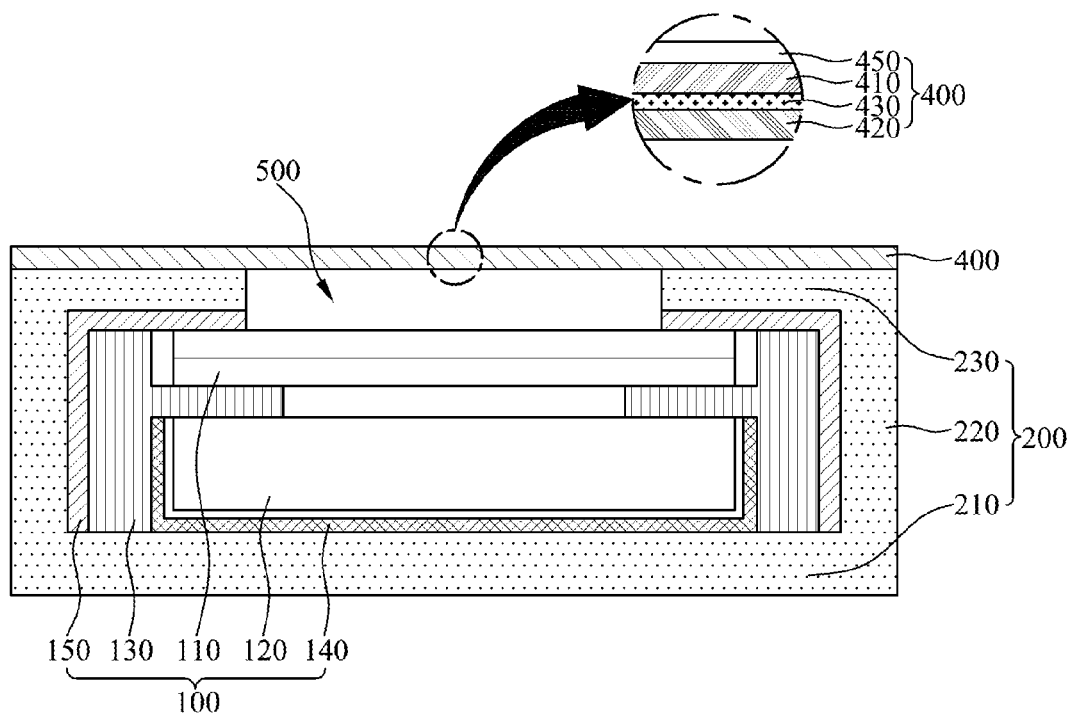
FIG. 5 is a cross section view illustrating an LCD device according to the third embodiment of the present invention.

FIG. 5 is a cross section view illustrating an LCD device according to the third embodiment of the present invention. Except that the protection plate (See '300' of FIG. 3) is removed, the LCD device of the third embodiment shown in FIG. 5 is identical in structure to the LCD device of the first embodiment shown in FIG. 3. Thus, the same reference numbers will be used throughout the drawings to refer to the same or like parts, and a detailed explanation for the same parts will be omitted.

As shown in FIG. 5, the color realization film 400 is attached to the set cover 200, and more particularly, the frontal set cover 230, which forms the forefront of the LCD device. In this case, the protection plate (See '300' of FIG. 3) is not provided.

The color realization film 400 comprises a cholesteric liquid crystal layer (CLC) 410; a quarter wave plate (QWP) 420; a first adhesive layer 430 formed between the cholesteric liquid crystal layer (CLC) 410 and the quarter wave plate (QWP) 420 to combine the cholesteric liquid crystal layer (CLC) 410 with the quarter wave plate (QWP) 420; and a protection layer 450 formed on the cholesteric liquid crystal layer (CLC) 410. Although not shown, an adhesive is formed between the frontal set cover 230 and the color realization film 400, to thereby combine the frontal set cover 230 with the color realization film 400.

Figure 6:
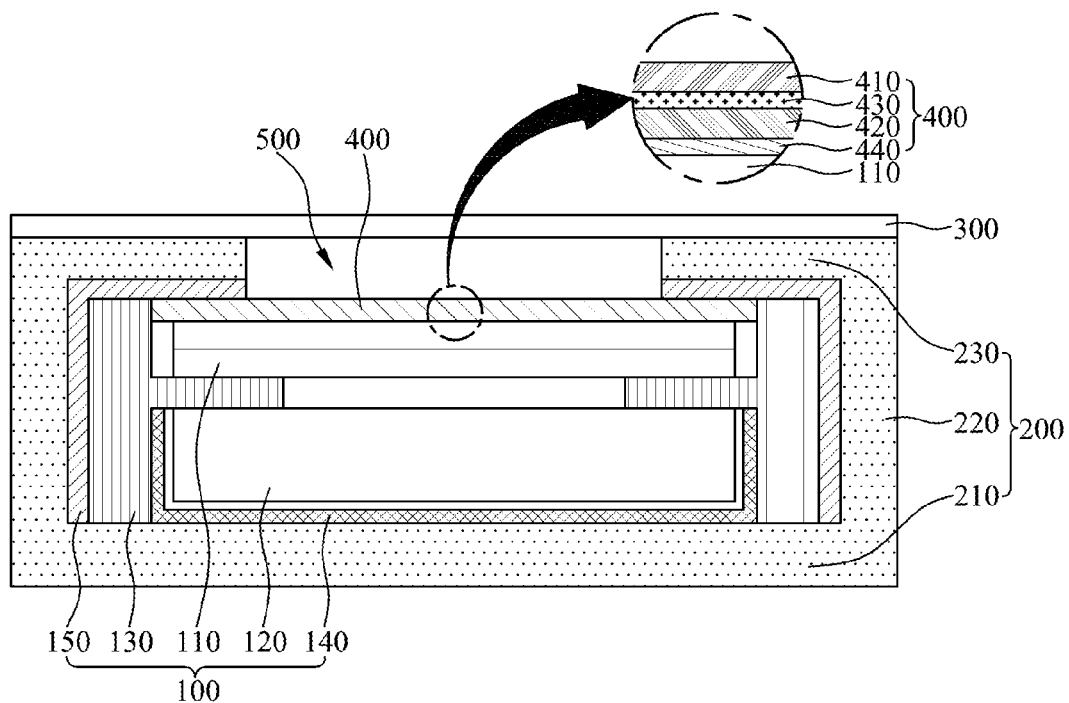
FIG. 6 is a cross section view illustrating an LCD device according to the fourth embodiment of the present invention.

FIG. 6 is a cross section view illustrating an LCD device according to the fourth embodiment of the present invention. Except that the color realization film 400 is changed in position, the LCD device of the fourth embodiment shown in FIG. 6 is identical in structure to the LCD device of the first embodiment shown in FIG. 3. Thus, the same reference numbers will be used throughout the drawings to refer to the same or like parts, and a detailed explanation for the same parts will be omitted.

As shown in FIG. 6, the protection plate 300 is attached to the set cover 200, and more particularly, the frontal set cover 230; and the color realization film 400 is formed on the liquid crystal panel 110 of the liquid crystal module 100, and more particularly, between the liquid crystal panel 110 and the upper case 150. That is, as shown in FIG. 6, the color realization film 400 is formed as one body with the liquid crystal module 100.

The color realization film 400 comprises a cholesteric liquid crystal layer (CLC) 410; a quarter wave plate (QWP) 420; a first adhesive layer 430 formed between the cholesteric liquid crystal layer (CLC) 410 and the quarter wave plate (QWP) 420 to combine the cholesteric liquid crystal layer (CLC) 410 with the quarter wave plate (QWP) 420; and a second adhesive layer 440 formed between the quarter wave plate (QWP) 420 and the liquid crystal panel 110 to combine the quarter wave plate (QWP) 420 with the liquid crystal panel 110. There is no additional protection layer such as protection film.

According to the first to fourth embodiments of the present invention, as shown in FIGS. 3 to 6, an air layer 500 is formed above the liquid crystal module 100. That is, in case of the LCD device according to the first embodiment shown in FIG. 3, the air layer 500 is formed between the liquid crystal panel 110 and the protection plate 300. In case of the LCD device according to the second embodiment shown in FIG. 4, and the LCD device according to the third embodiment shown in FIG. 5, the air layer 500 is formed between the liquid crystal panel 110 and the color realization film 400. In case of the LCD device according to the fourth embodiment shown in FIG. 6, the air layer 500 is formed between the color realization film 400 and the protection plate 300.

As shown in FIGS. 3 to 6, a height of the air layer 500 corresponds to the sum of a thickness of the upper case 150 and a thickness of the frontal set cover 230, whereby the air layer 500 is positioned at a high height. Thus, the light path may be changed or the light may be internally reflected by the air layer 500, which might deteriorate the picture quality. In this respect, there is a need to prevent the picture quality from being deteriorated by the air layer 500.

FIGS. 7 to 10 illustrate LCD devices according to various embodiments of the present invention proposed for minimizing the air layer, which will be described as follows.

Figure 7:
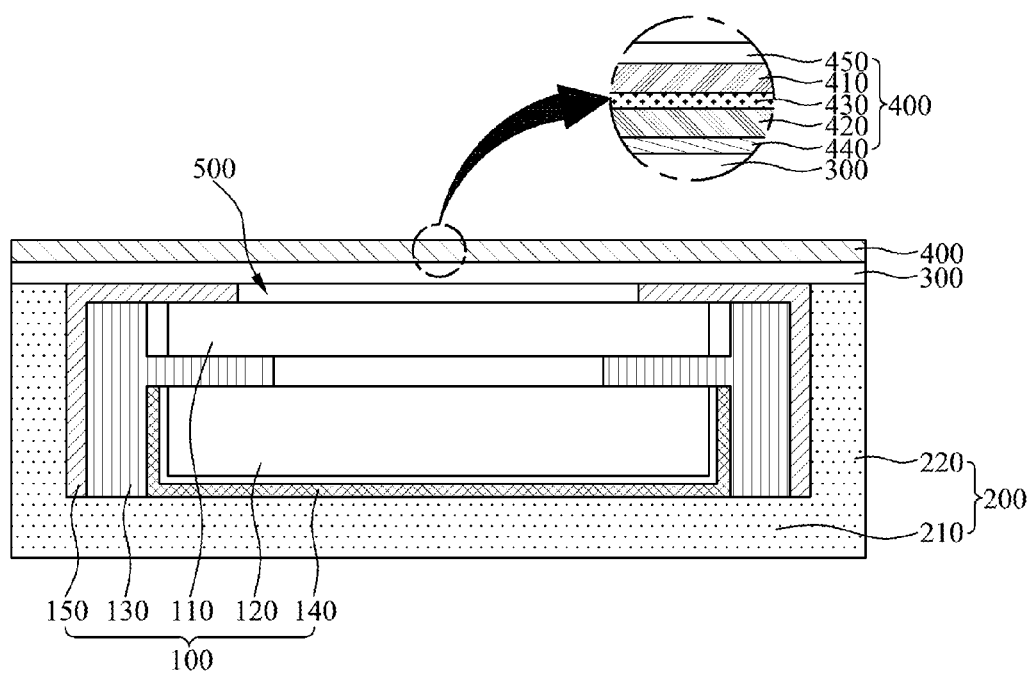
FIG. 7 is a cross section view illustrating an LCD device according to the fifth embodiment of the present invention.

FIG. 7 illustrates an LCD device according to the fifth embodiment of the present invention. Except a structural change of the set cover 200, the LCD device of the fifth embodiment shown in FIG. 7 is identical in structure to the LCD device of the first embodiment shown in FIG. 3, whereby only different parts will be explained as follows.

As shown in FIG. 7, a set cover 200 comprises a lower set cover 210; and a lateral set cover 220 extending from the lower set cover 210. In the set cover 200 shown in FIG. 7, there is no frontal set cover (See '230' of FIG. 3) for covering a frontal margin of a liquid crystal module 100. Thus, a protection plate 300 is formed on the lateral set cover 220, and an upper case 150 of the liquid crystal module 100.

Since there is no frontal set cover (See '230' of FIG. 3), it allows a reduced height of an air layer 500 between a liquid crystal panel 110 and a protection plate 300. The height of air layer 500 corresponds to a thickness of the upper case 150. In this case, it is possible to overcome the problem of deteriorated picture quality caused by the air layer 500.

Although not shown, if removing the upper case 150 as well as the frontal set cover, the protection plate 300 is formed on the lateral set cover 220, guide frame 130, and light crystal panel 110. In this case, the air layer 500 is completely removed, and a thickness of the LCD device is minimized.

Figure 8:
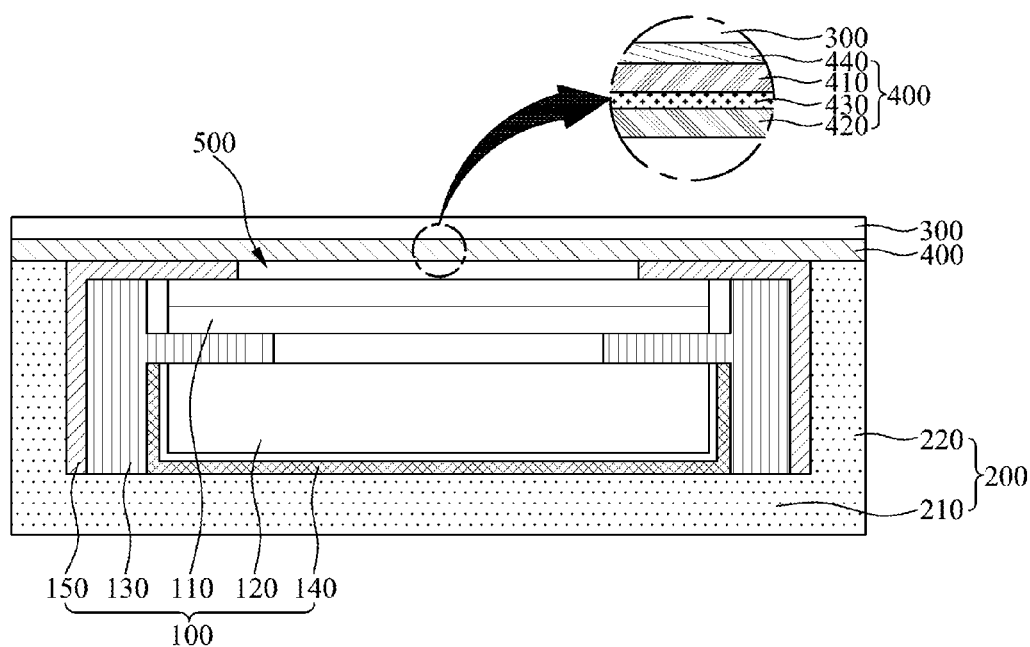
FIG. 8 is a cross section view illustrating an LCD device according to the sixth embodiment of the present invention.

FIG. 8 illustrates an LCD device according to the sixth embodiment of the present invention. Except a structural change of the set cover 200, the LCD device of the sixth embodiment shown in FIG. 8 is identical in structure to the LCD device of the second embodiment shown in FIG. 4, whereby only different parts will be explained as follows.

As shown in FIG. 8, a set cover 200 comprises a lower set cover 210; and a lateral set cover 220 extending from the lower set cover 210. In the set cover 200 shown in FIG. 8, there is no frontal set cover (See '230' of FIG. 4) for covering a frontal margin of a liquid crystal module 100. Thus, a color realization film 400 is formed on the lateral set cover 220, and an upper case 150 of the liquid crystal module 100.

Although not shown, if removing the upper case 150 as well as the frontal set cover, the color realization film 400 is formed on the lateral set cover 220, guide frame 130, and light crystal panel 110, to thereby completely remove the air layer 500.

Figure 9:
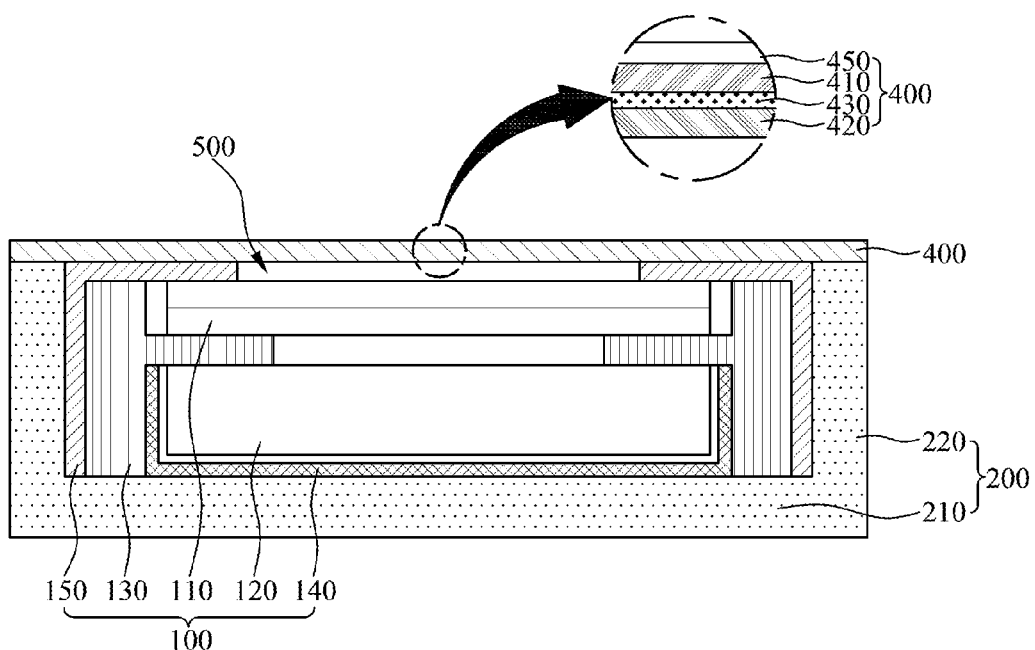
FIG. 9 is a cross section view illustrating an LCD device according to the seventh embodiment of the present invention.

FIG. 9 illustrates an LCD device according to the seventh embodiment of the present invention. Except a structural change of the set cover 200, the LCD device of the seventh embodiment shown in FIG. 9 is identical in structure to the LCD device of the third embodiment shown in FIG. 5, whereby only different parts will be explained as follows.

As shown in FIG. 9, a set cover 200 comprises a lower set cover 210; and a lateral set cover 220 extending from the lower set cover 210. In the set cover 200 shown in FIG. 9, there is no frontal set cover (See '230' of FIG. 5) for covering a frontal margin of a liquid crystal module 100. Thus, a color realization film 400 is formed on the lateral set cover 220, and an upper case 150 of the liquid crystal module 100.

Although not shown, if removing the upper case 150 as well as the frontal set cover, the color realization film 400 is formed on the lateral set cover 220, guide frame 130, and light crystal panel 110, to thereby completely remove the air layer 500.

Figure 10:
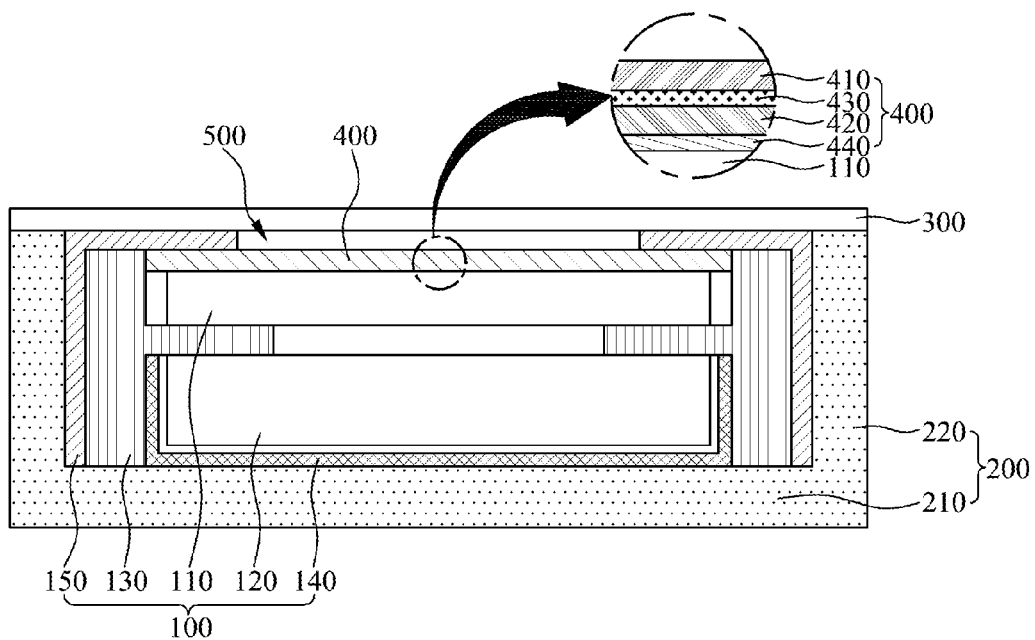
FIG. 10 is a cross section view illustrating an LCD device according to the eighth embodiment of the present invention.

FIG. 10 illustrates an LCD device according to the eighth embodiment of the present invention. Except a structural change of the set cover 200, the LCD device of the eighth embodiment shown in FIG. 10 is identical in structure to the LCD device of the fourth embodiment shown in FIG. 6, whereby only different parts will be explained as follows.

As shown in FIG. 10, a set cover 200 comprises a lower set cover 210; and a lateral set cover 220 extending from the lower set cover 210. In the set cover 200 shown in FIG. 10, there is no frontal set cover (See '230' of FIG. 6) for covering a frontal margin of a liquid crystal module 100. Thus, a protection plate 300 is formed on the lateral set cover 220, and an upper case 150 of the liquid crystal module 100.

Although not shown, if removing the upper case 150 as well as the frontal set cover, the protection plate 300 is formed on the lateral set cover 220, guide frame 130, and light crystal panel 110, to thereby completely remove the air layer 500.

As explained above, the air layer 500 may be minimized or may be completely removed. If needed, a space for the air layer 500 may be charged with an additional material layer, to thereby prevent light refraction or light reflection. The material layer to be charged in the space for the air layer 500 may be formed of an index-matching material, wherein the index-matching material may be a transparent material whose refractive index is the same as that of the liquid crystal panel 110.

As the LCD device according to the present invention includes the color realization film 400 to selectively the light with the predetermined wavelength even when the liquid crystal module 100 is turned-off. Thus, if applying the set cover 200 having the desire color depending on the user's taste, the color realization film 400 reflects the light with the color which is the same as that of the set cover 200. Thus, when the liquid crystal module 100 is turned-off, the entire front surface of the LCD device is shown as one color, thereby enhancing the aesthetic sense.

In comparison to the related art LCD device with the stepped front surface, the LCD device according to the present invention is designed to have the flat front surface, which enhances the aesthetic design effect.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An LCD device comprising:
    a liquid crystal module which comprises a liquid crystal panel for displaying an image;
    a set cover which supports the liquid crystal module; and
    a color realization film which selectively reflects light with a predetermined wavelength when the liquid crystal module is turned-off,
    wherein the color realization film comprises a cholesteric liquid crystal layer (CLC), a quarter wave plate (QWP) positioned between the cholesteric liquid crystal layer (CLC) and the liquid crystal module, and a first adhesive layer formed between the cholesteric liquid crystal layer (CLC) and the quarter wave plate (QWP), wherein the cholesteric liquid crystal layer (CLC) has one of the left-handed pitch or the right-handed pitch, wherein the quarter wave plate (QWP) polarizes the light emitted from the liquid crystal module, wherein the light polarized by the quarter wave plate (QWP) is polarized circularly in the direction which is opposite to the direction of the pitch of the cholesteric liquid crystal layer (CLC).

2. The LCD device according to claim 1, further comprising a protection plate formed between the set cover and the color realization film.

3. The LCD device according to claim 2, wherein the color realization film additionally comprises a second adhesive layer formed between the quarter wave plate (QWP) and the protection plate; and a protection layer formed on the cholesteric liquid crystal layer (CLC).

4. The LCD device according to claim 2, wherein the protection plate is formed on a lateral set cover for the set cover, and an upper case for the liquid crystal module.

5. The LCD device according to claim 2, wherein the protection plate is formed on a lateral set cover for the set cover, a guide frame for the liquid crystal module, and the liquid crystal panel.

6. The LCD device according to claim 1, further comprising a protection plate formed on the color realization film, wherein the color realization film additionally comprises a second adhesive layer formed between the cholesteric liquid crystal layer (CLC) and the protection plate.

7. The LCD device according to claim 6, wherein the color realization film is formed on a lateral set cover for the set cover, and an upper case for the liquid crystal module.

8. The LCD device according to claim 6, wherein the color realization film is formed on a lateral set cover for the set cover, a guide frame for the liquid crystal module, and the liquid crystal panel.

9. The LCD device according to claim 1, wherein the color realization film is attached onto the set cover, and the color realization film additionally comprises a protection layer formed on the cholesteric liquid crystal layer (CLC).

10. The LCD device according to claim 9, wherein the color realization film is formed on a lateral set cover for the set cover, and an upper case for the liquid crystal module.

11. The LCD device according to claim 9, wherein the color realization film is formed on a lateral set cover for the set cover, a guide frame for the liquid crystal module, and the liquid crystal panel.

12. The LCD device according to claim 1, wherein the color realization film is attached onto the liquid crystal panel.

13. The LCD device according to claim 12, further comprising a protection plate formed on the set cover.

14. The LCD device according to claim 13, wherein the protection plate is formed on a lateral set cover for the set cover, and an upper case for the liquid crystal module.

15. The LCD device according to claim 13, wherein the protection plate is formed on a lateral set cover for the set cover, a guide frame for the liquid crystal module, and the liquid crystal panel.

* * * * *